Figure 1:
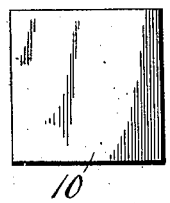

No. 778,317. PATENTED DEC. 27, 1904.
A. JOHNSTON.
PROCESS OF REMOVING GREASE OR OIL FROM HOLLOW METALLIC BALLS.
APPLICATION FILED JUNE 2, 1903.

No. 778,317. Patented December 27, 1904.

UNITED STATES PATENT OFFICE.

ALLEN JOHNSTON, OF OTTUMWA, IOWA.

PROCESS OF REMOVING GREASE OR OIL FROM HOLLOW METALLIC BALLS.

SPECIFICATION forming part of Letters Patent No. 778,317, dated December 27, 1904.

Application filed June 2, 1903. Serial No. 159,819.

*To all whom it may concern:*

Be it known that I, ALLEN JOHNSTON, of Ottumwa, Iowa, have invented a new and useful Process of Removing Grease or Oil from Hollow Metallic Balls, which process is fully set forth in the following specification.

In the formation of hollow metallic balls from sheet-metal blanks in the manner set forth in my application for patent, Serial No. 101,419, filed April 4, 1902, as well as in the subsequent operations of truing, condensing, and polishing such balls, as set forth in my Patents Nos. 698,707, 709,409, and 720,436, it has been found necessary, at least for the obtainment of satisfactory results and to avoid wear upon and injury to the dies and other mechanism employed, to liberally apply grease and oil to the metal being operated upon or to the operating devices or parts, or to both. A certain quantity of this oil or grease not only adheres to the exterior surface of the completed ball, but is inclosed within the ball. For certain uses of the balls the presence of this oil or grease is an advantage, rendering the ball self-lubricating, as described and claimed in my application filed June 2, 1903, Serial No. 159,820; but for other uses of the balls the presence of any oil or grease either on the exterior or the interior thereof—that on the interior finding its way to the exterior through the small cracks, crevices, or seams formed where the edges of the blank come together—is objectionable and a disadvantage. For example, when used for antifriction purposes it is desirable in some instances that the balls be entirely free from oil or grease, and in many uses other than for bearing purposes the presence of oil or grease would be highly objectionable. Furthermore, in cases where it is desirable to finish the balls, as by plating or lacquering, the presence of oil or grease would prevent or interfere with the attainment of the desired finish.

My present invention is a process of removing oil or grease both from the exterior and interior of hollow metallic balls, the principal step thereof consisting in subjecting the balls to heat sufficient to burn off or otherwise remove said oil or grease. In case the balls are heavily coated with solidified oil or grease the bulk of the latter will of course upon liquefying run off of or out of the balls, that remaining being burned off as the heat increases. The heating of the balls causes them to expand slightly, spreading and opening the seams, so that the exterior heat can more readily pass into the balls and the contained grease or oil be more readily removed. As the heat thus employed darkens or discolors the balls and as it is desirable for some uses that the balls be bright and polished, the heating operation is in such cases followed by a polishing step, the polishing being effected by rattling or in any other suitable way, as by shutting off the burner and continuing to revolve the drum or in any other suitable way.

The invention will be further described, in connection with the accompanying drawings, wherein—

Figure 2:
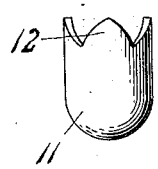
Figure 3:
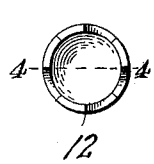
Figure 4:
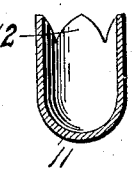
Figure 5:
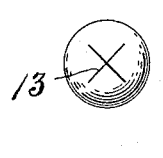
Figure 6:
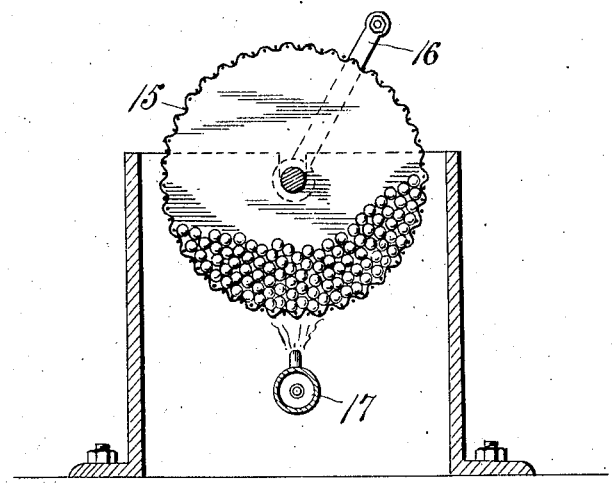

Figures 1 to 5 illustrate the manufacture of a hollow ball from a square sheet-metal blank, Fig. 1 being a plan of the blank, Fig. 2 an elevation showing the blank struck up into cup form, Fig. 3 a plan of Fig. 2, Fig. 4 a vertical section on line 4 4 of Fig. 3, and Fig. 5 a plan of a completed ball. Fig. 6 is a transverse section, and Fig. 7 a longitudinal section, through a tumbling screen and burner for subjecting the balls to the required heat.

10, Fig. 1, is a square blank, which is first bent to the shape of cup 11, Fig. 2, by the use of suitable dies. This cup is next reduced to spherical shape, Fig. 5, by the use of suitable dies which act to bring the points or apices 12 together, the edges thereof forming seams 13, Fig. 5. Although these seams are closed in the sense that the edges forming the same fit closely together, they are not air or liquid tight, and oil or grease accumulating on the interior surface of the ball during the operation of forming or of polishing, condensing, or otherwise finishing the same will, if not removed, ooze out through the seam or seams.

Figure 7:
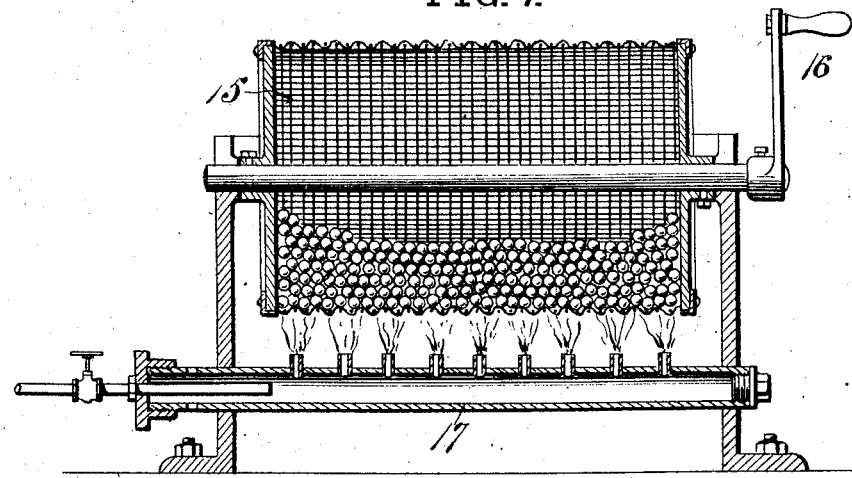

In Figs. 6 and 7, 15 is a rotary tumbling screen or drum, which may be driven by power or rotated by a handle 16. The balls from which grease or oil is to be removed are placed in the drum, agitated by the rotation thereof, and heated by a gas-air burner 17 beneath the drum to a temperature sufficient to burn off all oil or grease from both the interior and exterior surfaces of the balls. Where it is desired that the balls shall be bright, they are subjected to a polishing operation either before or after being removed from the tumbling-screen.

While Figs. 6 and 7 show a convenient form of apparatus for subjecting the balls to heat, any other suitable arrangement may be employed.

What I claim is—

1. The herein-described process of removing grease from hollow balls having a closed seam or seams in its walls, which consists in expanding or opening said seam or seams by the application of heat, whereby the contained grease will be converted to a liquid or gas and permitted to escape, and then burning the grease.

2. The herein-described process of removing grease from hollow balls having a closed seam or seams in its walls, which consists in expanding or opening said seam or seams by the application of heat, whereby the contained grease will be converted to a liquid or gas and permitted to escape, then burning the grease, and finally polishing the ball.

In testimony whereof I have signed this specification in the presence of two subscribing witnesses.

ALLEN JOHNSTON.

Witnesses:
  R. W. FUNK,
  J. B. MOWREY.